(12) United States Patent
Demilie

(10) Patent No.: US 7,682,588 B2
(45) Date of Patent: Mar. 23, 2010

(54) PROCESS FOR THE MANUFACTURE OF SODIUM CARBONATE

(75) Inventor: Paul Demilie, Lustin (BE)

(73) Assignee: SOLVAY (Societe Anonyme), Brussels (BE)

( * ) Notice: Subject to any disclaimer, the term of this patent is extended or adjusted under 35 U.S.C. 154(b) by 810 days.

(21) Appl. No.: 10/556,604

(22) PCT Filed: May 19, 2004

(86) PCT No.: PCT/EP2004/050857

§ 371 (c)(1),
(2), (4) Date: Nov. 14, 2005

(87) PCT Pub. No.: WO2004/103905

PCT Pub. Date: Dec. 2, 2004

(65) Prior Publication Data

US 2007/0050949 A1    Mar. 8, 2007

(30) Foreign Application Priority Data

May 21, 2003   (FR)   .................................. 03 06362

(51) Int. Cl.
*C01D 7/12*      (2006.01)

(52) U.S. Cl. ...................... 423/425; 23/302 T; 423/427
(58) Field of Classification Search ................ 23/302 T; 423/425, 427

See application file for complete search history.

(56) References Cited

U.S. PATENT DOCUMENTS

| 2,798,790 | A | 7/1957 | Pike |
| 3,780,160 | A | 12/1973 | Taylor et al. |
| 5,766,270 | A | 6/1998 | Neuman et al. |
| 6,207,123 | B1 | 3/2001 | Tanaka et al. |
| 6,478,828 | B1 * | 11/2002 | Ninane et al. ................. 23/301 |

* cited by examiner

*Primary Examiner*—Stuart Hendrickson
(74) *Attorney, Agent, or Firm*—Oblon, Spivak, McClelland, Maier & Neustadt, L.L.P.

(57) ABSTRACT

Process for the manufacture of sodium carbonate crystals comprising: the addition of solid sodium carbonate (1) to an aqueous solution comprising sodium bicarbonate and sodium carbonate; the crystallization and the separation of sodium sesquicarbonate crystals; (B, C) the crystallization of sodium carbonate crystals, (E) the amount of sodium carbonate added being adjusted so that the crystallization of sesquicarbonate crystals can be carried out without preliminary evaporation of the aqueous suspension.

20 Claims, 3 Drawing Sheets

PROCESS FOR THE MANUFACTURE OF SODIUM CARBONATE

Figure 1:
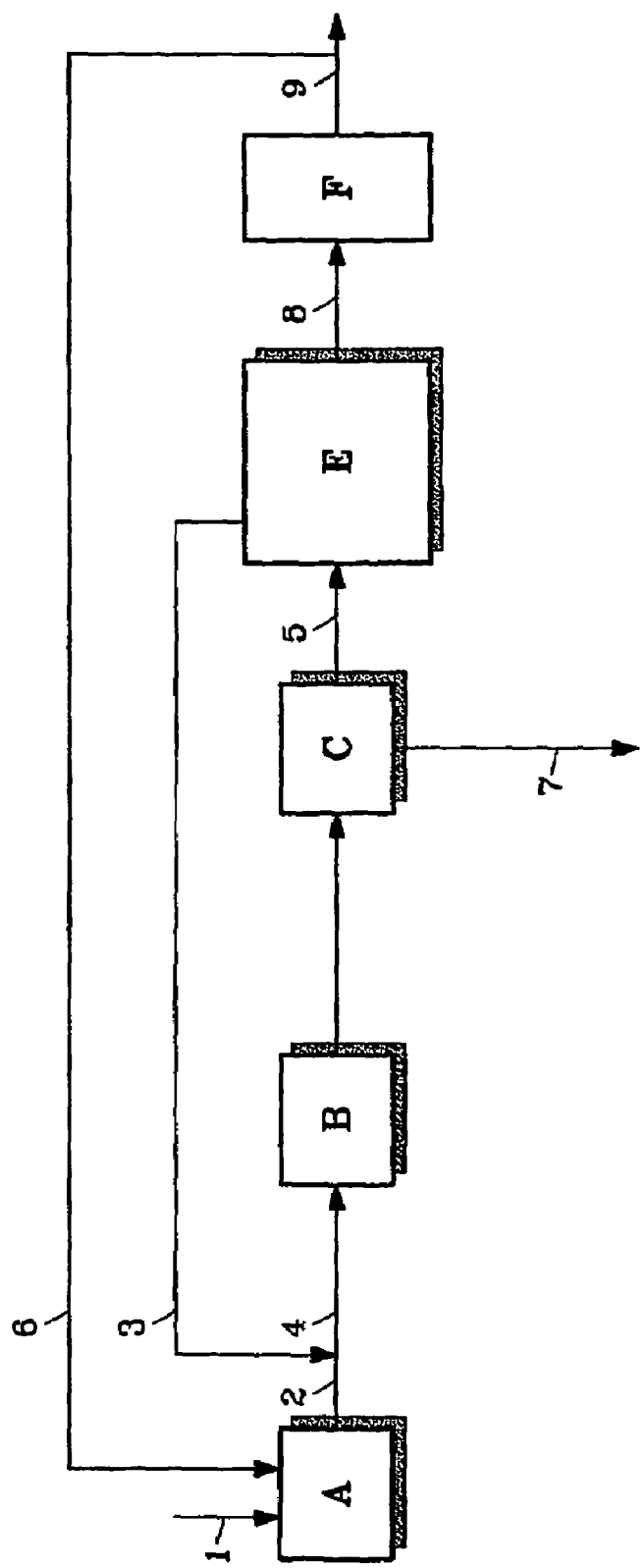

The invention relates to a process for the manufacture of sodium carbonate.

It relates more particularly to a process for the manufacture of sodium carbonate starting from an ore comprising sodium sesquicarbonate.

Sodium sesquicarbonate is an inorganic compound with a general composition $Na_2CO_3.NaHCO_3.2H_2O$. It originates, for example, from trona deposits. Such deposits, from which may be extracted ores comprising from 80 to 95% by weight of sodium sesquicarbonate, are found, for example, in the state of Wyoming in the United States.

Trona ores can be extracted from the deposits in the solid state, by known mining techniques. It is also possible to inject, into the deposits, an aqueous solution which, on contact with the ore, is enriched in sodium carbonate and bicarbonate. The aqueous solution enriched on contact with the ore is commonly referred to as aqueous extraction liquor.

The latter technique proves to be very advantageous economically, in particular when it is combined with conventional extraction of solid ore.

Trona ores, in addition to the sesquicarbonate, comprise numerous impurities.

Various processes have been provided for purifying these ores and for extracting therefrom sodium carbonate, which can be enhanced in value, in particular in the glass making industry.

The commonest, which will in the continuation of the statement be referred to as "conventional process", consists in calcining the trona, in order to obtain impure sodium carbonate, in dissolving the latter in water, filtering off the impurities and crystallizing sodium carbonate monohydrate starting from the purified solution, the sodium carbonate monohydrate finally being dried to provide the desired anhydrous sodium carbonate.

In the case where it is desired to extract the trona ore by combining the extraction in the solid state and the extraction by dissolving, this known process has to be improved as the presence of significant amounts of sodium bicarbonate in the aqueous solution interferes with the crystallization of sodium carbonate monohydrate.

U.S. Pat. No. 6,207,123 discloses an improved process which solves this disadvantage by bringing about crystallization of sesquicarbonate, which is subsequently separated, starting from the solution extracted from the deposit.

However, according to this process, this crystallization requires preliminary evaporation of the solution, compensated for by introduction of water at another stage. This therefore results in particular in a significant energy consumption.

An improved process has now been found which makes it possible to avoid the evaporation of the aqueous solution starting from which the sodium sesquicarbonate is crystallized.

Consequently, the invention relates to a process for the manufacture of sodium carbonate crystals comprising the following stages:

a) the addition of sodium carbonate to an aqueous solution comprising sodium bicarbonate and sodium carbonate, in order to form an aqueous suspension;
b) the crystallization and the separation of sodium sesquicarbonate crystals stating from the aqueous suspension, in order to obtain sesquicarbonate crystals, on the one hand, and an aqueous mother liquor, on the other hand;
c) the crystallization and the separation of sodium carbonate crystals starting from the aqueous mother liquor, the process being characterized in that the amount of sodium carbonate added in stage a) is adjusted so that the crystallization of sesquicarbonate crystals in stage b) can be carried out without preliminary evaporation of the aqueous suspension.

The first stage of the process according to the invention consists in adding sodium carbonate to an aqueous solution. This aqueous solution can have various origins. However, according to a preferred embodiment of the invention, the aqueous solution comprises an aqueous extraction liquor originating from pumping into a trona deposit.

The term "aqueous extraction liquor" is used to refer to an aqueous solution comprising sodium bicarbonate and sodium carbonate obtained by injecting, by pumping techniques, an aqueous solvent into a trona deposit. On contact with the deposit, the aqueous solvent dissolves trona and becomes laden with $CO_3^{2-}$, $HCO_3^-$ and $Na^+$ ions. This technique exhibits in particular the advantage of making possible the ready exploitation of collapsed deposits.

Advantageously, when the process according to the invention is combined with a conventional process for the production of sodium carbonate starting from trona, use is made, as aqueous solvent, of an aqueous discharge liquor recovered from the conventional production plant The aqueous solution used in the first stage of the process can be composed of whole or part of the aqueous extraction liquor as extracted directly by pumping. It can also result from various treatments (for example, for purification or enriching) applied to the solution extracted from the deposit In an advantageous alternative form of this embodiment, the aqueous solution is composed of an aqueous extraction liquor originating exclusively and directly from pumping into a trona deposit The aqueous extraction liquor advantageously comprises more than 5%, preferably more than 10%, of sodium carbonate. However, it is desirable for its content of sodium carbonate to remain below 20%. Moreover, the aqueous extraction liquor advantageously comprises more than 2%, preferably more than 3%, of sodium bicarbonate.

The sodium carbonate added to this aqueous solution can originate from various sources. It is preferably added in the solid form. A portion of the sodium carbonate produced can be removed for this purpose. However, in a preferred embodiment of the invention, the sodium carbonate added is solid sodium carbonate originating from the calcination of trona.

Generally, ore calcination is an operation well known per se. In the case of trona, it consists in subjecting the ore to a heat treatment under conditions adjusted to decompose the sodium sesquicarbonate and to form anhydrous sodium carbonate. Concomitantly, carbon dioxide gas $CO_2$ is given off. The heat treatment generally comprises heating at a temperature of greater than 100° C., preferably at least equal to 120° C., for example between 125 and 200° C.

In this preferred embodiment of the invention, the technique employed to carry out the calcination is not critical. Use is advantageously made of that disclosed in the document WO94/27725. Furthermore, when the process according to the invention is made use of in conjunction with a conventional process for the production of sodium carbonate starting from trona, it is preferable to use the calcinator thereof.

According to this embodiment of the invention, the calcined trona is advantageously composed of a granular part having a diameter of between 0.5 and 6 mm, recovered directly at the outlet of the calcinators, and of dust, recovered at the bottom of the electrostatic filters which treat the calcination gases. This dust has a diameter of between a few microns and 0.1 mm, for example between 5 and 50 microns.

According to the invention, the addition of solid sodium carbonate to the aqueous solution is carried out by dispersion and dissolution. To this end, dissolvers are used in a way known per se. The temperature at which dispersion/dissolution is carried out is preferably greater than 20° C. It is not advantageous to exceed temperatures of 40° C. Temperatures of between 25 and 35° C. are generally highly suitable.

The sodium carbonate added can comprise impurities. It can originate from calcined sodium sesquicarbonate or trona.

According to the invention, the amount of sodium carbonate added is sufficient for the crystallization of sesquicarbonate crystals in stage b) to be able to take place without preliminary evaporation of the aqueous suspension. This essential characteristic of the invention thus consists in adding sodium carbonate until the solubility limit of sodium sesquicarbonate is exceeded.

In practice, it is often advantageous to add sodium carbonate so that the content of sodium carbonate in the aqueous suspension reaches at least 25%, preferably at least 29%, the percentages being calculated with respect to the weight of the residual aqueous mother liquor after separation of the crystallized sesquicarbonate in stage b).

Although not being strictly ruled out the addition of excessive amounts of sodium carbonate is, however, to be avoided. It is generally desirable for the content of sodium carbonate in the aqueous suspension not to exceed 40%, preferably 38%, by weight.

According to an advantageous embodiment of the invention, the amount of sodium carbonate added is such that the content of sodium carbonate in the aqueous suspension is between 31 and 37% by weight Preferably, this content is between 33 and 36% by weight The aqueous suspension obtained following the addition of sodium carbonate is subsequently subjected to maturing, on conclusion of which crystals of sodium sesquicarbonate will be formed spontaneously, without requiring preliminary evaporation of the aqueous solution. The maturing is advantageously carried out at a temperature varying from 30 to 32° C.

The sodium sesquicarbonate crystals are collected and separated. The maturing of the aqueous suspension and the separation of the sodium sesquicarbonate crystals formed can be carried out in crystallizers. Such devices are known. Use will be made, for example, of the crystallizer disclosed in Patent EP 0 073 085 (Solvay).

To control the temperature, this crystallizer can be used in combination with a heat exchanger placed as a bypass on the crystallizer. Temperature control can also be carried out using a coil placed in the crystallizer. Water or steam are passed through the coil.

The sesquicarbonate crystals collected and separated are advantageously dewatered, for example in a continuous pusher centrifuge or on a vacuum filter, such as a belt filter. A description of these devices may be found in "Natural Soda Ash", D. E. Garrett, published by Van Nostrand, 1992, p. 292.

The separation of the sodium sesquicarbonate makes it possible to remove the excess in concentration of $HCO_3^-$ ions originating, for example, from the dissolution of trona in the aqueous extraction liquors. Preferably, an amount of sesquicarbonate is separated such that more than 80% of the $HCO_3^-$ ions present in the aqueous solution are removed.

In a preferred embodiment of the process according to the invention, the sodium sesquicarbonate separated at stage b) is subsequently calcined. In the case where the process according to the invention is used in combination with a known process for the production of sodium carbonate staring from trona in the solid state, the crystallized and separated sesquicarbonate can be calcined with the solid trona extracted from the deposit In an advantageous embodiment of the process according to the invention, sodium carbonate is added to the aqueous mother liquor resulting from stage b).

The carbonate advantageously originates from trona extracted in the solid state, for example mechanically, from the deposit and subsequently calcined.

It can also comprise, preferably, the sodium sesquicarbonate crystallized in stage b) of the process according to the invention, which has been calcined beforehand. The sodium carbonate, in the solid state, can be dissolved directly in the crystallization aqueous mother liquor or can be dissolved beforehand in a separate aqueous solution, the latter solution subsequently being mixed with the aqueous mother liquor.

The crystallization of sodium carbonate in stage c) is advantageously carried out, in a known way, in a crystallizer/evaporator. Such a device is described, for example, in "Natural Soda Ash", D. E. Garrett, published by Van Nostrand, p. 289.

It is desirable, during the crystallization of the sodium carbonate, to maintain a temperature of between 80 and 100° C., preferably between 85 and 95° C.

The sodium carbonate obtained is sodium carbonate monohydrate.

In a preferred embodiment of the process according to the invention, the sodium carbonate monohydrate is subsequently dried to produce anhydrous sodium carbonate.

Use may be made, for the drying of the sodium carbonate monohydrate to anhydrous sodium carbonate, in a known way, of a device similar to that used for the calcination of trona, for example that disclosed in the document WO 94/27725.

The aqueous solution, the sodium carbonate added in stage a) and the sesquicarbonate crystallized in stage b) generally comprise substantial amounts of impurities capable of being reencountered in the anhydrous sodium carbonate produced. When it is desired to obtain an anhydrous sodium carbonate of high purity, it is therefore essential to remove impurities during the process.

According to an advantageous alternative form of the process according to the invention, impurities are extracted from the aqueous mother liquor between stages b) and c), before the crystallization of the sodium carbonate monohydrate. Extraction can be carried out by any known means, such as filtration or particle size classification. In a preferred embodiment of this alternative form, the process according to the invention does not comprise other extractions of impurities. In a particularly preferred way, the aqueous suspension is not purified before the crystallization/separation of the sodium sesquicarbonate. This results in a substantial simplification of the plant.

The crystallization aqueous mother liquor from the sodium carbonate monohydrate resulting from stage c) can be discarded. Nevertheless, it is preferable to recover it in value. To this end, it is advantageous to add a portion of the aqueous mother liquor to the aqueous solution or to the aqueous suspension, that is to say before, during or after the addition of sodium carbonate.

In a preferred alternative form of the process according to the invention, a portion of the aqueous mother liquor resulting from stage c) is added to the aqueous solution during stage a). In this alternative form, by virtue of the low content of bicarbonate in the aqueous mother liquor added, the content of bicarbonate in the aqueous solution can be further reduced.

The process according to the invention makes it possible to exploit trona deposits in a very complete fashion by having recourse both to conventional techniques for mechanical mining extraction and to pumping techniques.

Details and distinctive features of the invention will emerge from the following description of the appended figures.

FIG. 1 is a diagram illustrating the operation of the process according to the invention, in accordance with Example 1. The aqueous extraction liquor (1) has added to it, in a dissolver (A), sodium carbonate (6), removed from production (9), and is then mixed with a portion of the aqueous mother liquor resulting from the crystallization of the sodium carbonate monohydrate (3). The resulting mixture is introduced into a crystallizer (B). The sodium sesquicarbonate crystals (7) are separated from the aqueous mother liquor (5) in a separator (C). The aqueous mother liquor (5) is subsequently introduced into a crystallizer/evaporator (E). Finally, the sodium carbonate monohydrate (8) is introduced into a dryer (F) to produce anhydrous sodium carbonate (9).

Figure 2:
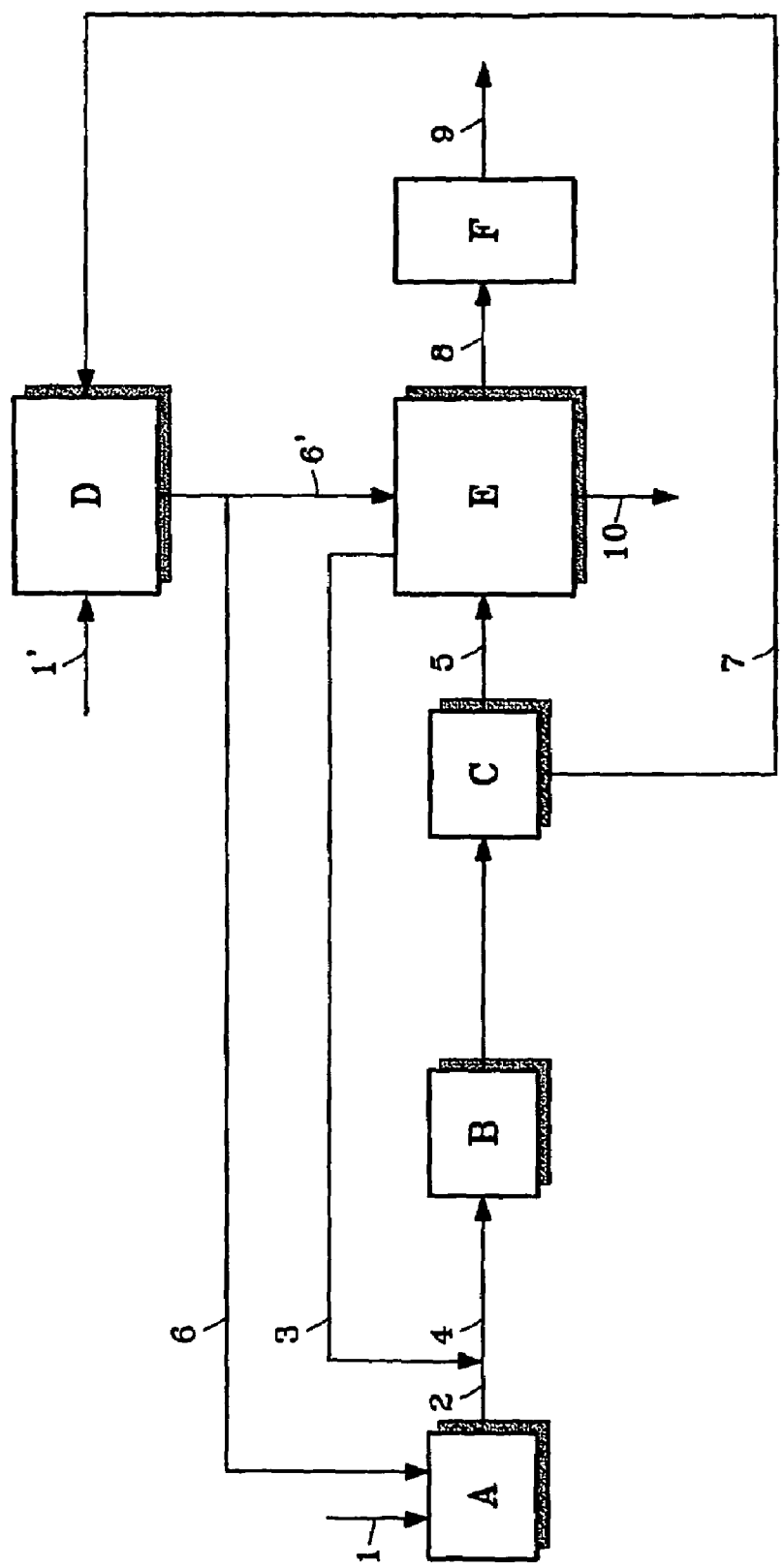

FIG. 2 is a diagram illustrating the operation of the process according to the invention when it is made use of in combination with a conventional process for the production of sodium carbonate stating from trona This operation is distinguished from that illustrated in FIG. 1 by the presence of a calcinator (D) into which trona ore (1') and the sesquicarbonate (7) are introduced. The sodium carbonate resulting from the calcination of the trona is introduced into the dissolver (A) and also into the crystallization aqueous mother liquor from the crystallizer/evaporator (E). An outlet for the filtered impurities (10) is also provided.

Figure 3:
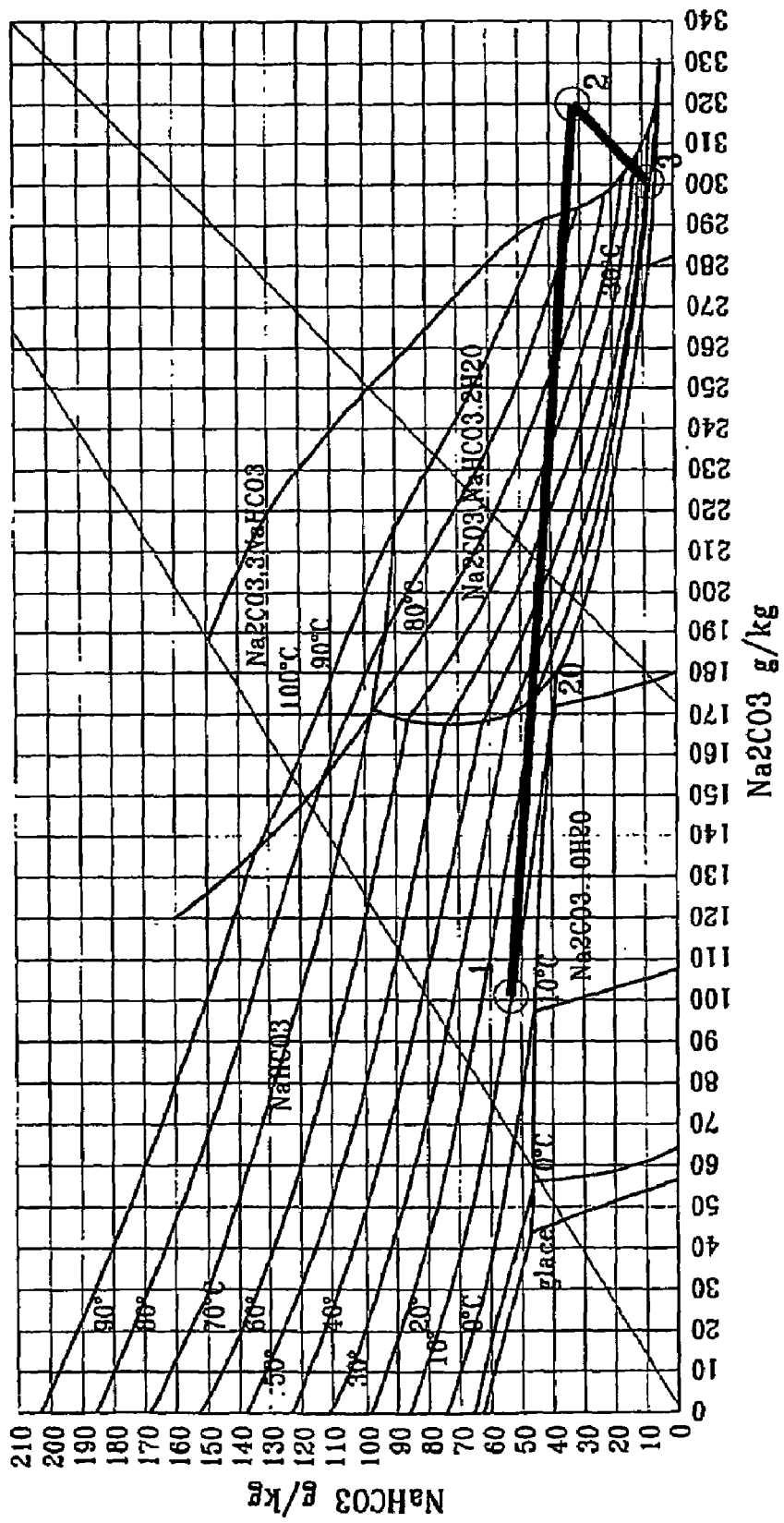

FIG. 3 represents a $NaHCO_3$—$Na_2CO_3$—$H_2O$ solubility diagram The following have been represented in this diagram: the aqueous extraction liquor (1), the aqueous suspension (2) and the aqueous mother liquor from crystallization of the sesquicarbonate (3).

The advantage of the invention will become more clearly apparent in the light of the appended examples.

EXAMPLE 1

In Accordance with the Invention

As illustrated in FIG. 1, 1000 kg of aqueous extraction liquor (1), originating from the pumping of a collapsed trona deposit, were mixed with 350 kg of sodium carbonate removed from the sodium carbonate produced during a previous trial. The 1000 kg of aqueous extraction liquor comprise 130 kg of sodium carbonate and 40 kg of sodium bicarbonate. This results in 1350 kg of aqueous suspension. This aqueous suspension is subsequently mixed with 600 kg of aqueous mother liquor (3) originating from the crystallization of sodium carbonate monohydrate comprising 180 kg of sodium carbonate. The resulting 1950 kg (4) are subjected to maturing in a crystallizer (B) and 107.5 kg of sodium sesquicarbonate (7) are crystallized therein and then separated in a dewatering device (C). The 1842.5 kg of aqueous mother liquor from crystallization (5) of the sesquicarbonate are then introduced, after filtration and removal of the impurities, into an evaporator/crystallizer to produce approximately 713 kg of sodium carbonate monohydrate. This sodium carbonate monohydrate is finally introduced into the dryer (F) and 609.5 kg of anhydrous sodium carbonate are obtained.

EXAMPLE 2

In Accordance with the Invention

Processing was carried out as in the preceding example, except that the carbonate mixed with the aqueous extraction liquor originates from the calcination of a mixture composed, on the one hand, of 662 kg of trona ore, comprising approximately 627 kg of sodium sesquicarbonate and 35 kg of impurities, and, on the other hand, of the 107.5 kg of sesquicarbonate crystallized and separated from the aqueous suspension.

The invention claimed is:

1. A process for the manufacture of sodium carbonate monohydrate crystals comprising:
   a) the addition of sodium carbonate to an aqueous solution comprising sodium bicarbonate and sodium carbonate in an amount sufficient to exceed the solubility of sodium sesquicarbonate and to form an aqueous suspension comprising crystals of sodium sesquicarbonate;
   b) the separation of sodium sesquicarbonate crystals from the aqueous suspension, in order to obtain sesquicarbonate crystals, on the one hand, and an aqueous mother liquor, on the other hand; and
   c) the crystallization and the separation of sodium carbonate monohydrate crystals from the aqueous mother liquor.

2. The process according to claim 1, wherein the sodium carbonate added to the aqueous solution is solid sodium carbonate originating from the calcination of trona.

3. The process according to claim 1, wherein the aqueous solution comprises an aqueous extraction liquor pumped out of a trona deposit.

4. The process according to claim 1, wherein the amount of sodium carbonate added to the aqueous solution is such that its content of sodium carbonate is between 31 and 37% by weight.

5. The process according to claim 4, wherein the amount of sodium carbonate added to the aqueous solution is such that its content of sodium carbonate is between 33 and 36% by weight.

6. The process according to claim 1, wherein the sodium sesquicarbonate separated in b) is subsequently calcined.

7. The process according to claim 1, further comprising adding sodium carbonate to the aqueous mother liquor resulting from b).

8. The process according to claim 1, further comprising extracting impurities from the aqueous mother liquor between b) and c), before the crystallization of the sodium carbonate monohydrate.

9. The process according to claim 1, wherein the separation of sodium carbonate crystals from the mother liquor in c) provides said crystals and an aqueous liquor, and wherein a portion of the aqueous liquor is added to the aqueous solution during a).

10. The process according to claim 1, wherein the formation of the aqueous suspension comprising crystals of sodium sesquicarbonate comprises maturation at a temperature of 30-32° C.

11. A process for the manufacture of sodium carbonate monohydrate crystals comprising:
   a) the addition of sodium carbonate to an aqueous solution comprising sodium bicarbonate and sodium carbonate, in order to form an aciueous suspension;

b) the crystallization and the separation of sodium sesquicarbonate crystals from the aqueous suspension, in order to obtain sesciuicarbonate crystals, on the one hand, and an aqueous mother liquor, on the other hand;

c) the crystallization and the separation of sodium carbonate monohydrate crystals from the aqueous mother liquor, wherein the amount of sodium carbonate added in a) is adjusted so that sodium sesquicarbonate solubility is exceeded, and so that the crystallization of sesquicarbonate crystals in b) can be carried out without preliminary evaporation of the aqueous suspension, and wherein the crystallization of sesquicarbonate crystals in b) is carried out without preliminary evaporation of the aqueous suspension.

12. The process according to claim 11, wherein the sodium carbonate added to the aqueous solution is solid sodium carbonate originating from the calcination of trona.

13. The process according to claim 11, wherein the aqueous solution comprises an aqueous extraction liquor pumped out of a trona deposit.

14. The process according to claim 11, wherein the amount of sodium carbonate added to the aqueous solution is such that its content of sodium carbonate is between 31 and 37% by weight.

15. The process according to claim 14, wherein the amount of sodium carbonate added to the aqueous solution is such that its content of sodium carbonate is between 33 and 36% by weight.

16. The process according to claim 11, wherein the sodium sesquicarbonate separated in b) is subsequently calcined.

17. The process according to claim 11, further comprising adding sodium carbonate to the aqueous mother liquor resulting from b).

18. The process according to claim 11, further comprising extracting impurities from the aqueous mother liquor between b) and c), before the crystallization of the sodium carbonate monohydrate.

19. The process according to claim 11, wherein the separation of sodium carbonate crystals from the mother liquor in c) provides said crystals and an aqueous liquor, and wherein a portion of the aqueous liquor resulting from c) is added to the aqueous solution during a).

20. The process according to claim 11, wherein the crystallization of sodium sesquicarbonate crystals from the aqueous suspension is accomplished by maturation at a temperature of 30-32° C.

* * * * *

UNITED STATES PATENT AND TRADEMARK OFFICE
CERTIFICATE OF CORRECTION

PATENT NO. : 7,682,588 B2
APPLICATION NO. : 10/556604
DATED : March 23, 2010
INVENTOR(S) : Paul Demilie Page 1 of 1

It is certified that error appears in the above-identified patent and that said Letters Patent is hereby corrected as shown below:

Column 6, line 67, Claim 11, "aciueous" should read --aqueous--

Signed and Sealed this

Tenth Day of August, 2010

David J. Kappos
*Director of the United States Patent and Trademark Office*